March 19, 1957   R. W. HENNING   2,785,401
SHIELD AND GAUGE STRUCTURES FOR POWDER-ACTUATED TOOLS
Filed Oct. 14, 1954   2 Sheets-Sheet 1
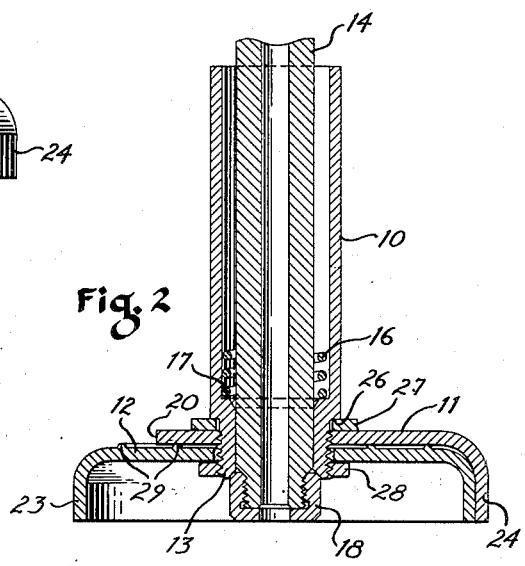
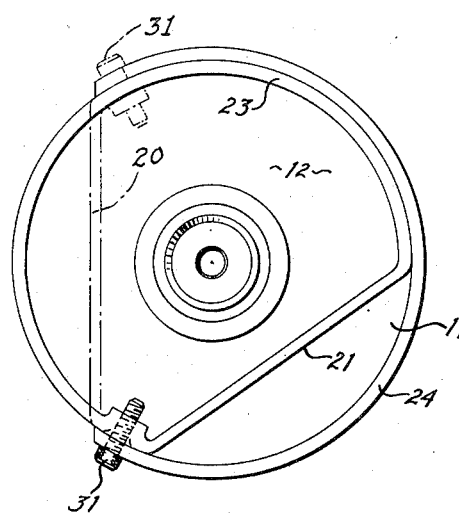
INVENTOR.
Robert W. Henning
BY
Hyde, Meyer, Baldwin & Doran
ATTORNEYS March 19, 1957 R. W. HENNING 2,785,401
SHIELD AND GAUGE STRUCTURES FOR POWDER-ACTUATED TOOLS
Filed Oct. 14, 1954 2 Sheets-Sheet 2

INVENTOR.
Robert W. Henning
BY
Hyde, Meyer, Baldwin & Doran
ATTORNEYS

United States Patent Office 2,785,401
Patented Mar. 19, 1957

2,785,401

SHIELD AND GAUGE STRUCTURES FOR POWDER-ACTUATED TOOLS

Robert W. Henning, Rocky River, Ohio, assignor to Portable Industries, Inc., Cleveland, Ohio, a corporation of Ohio Application October 14, 1954, Serial No. 462,262

14 Claims. (Cl. 1—44.5)

This invention relates to work-engaging safety shield and spacing gauge structures for use with hand held powder-actuated tools by which pins, studs and the like are embedded, for securing and supporting purposes, in steel, concrete, masonry, etc.

The invention has for its primary object the provision of a safety shield and spacing gauge structure which is characterized by its simplicity of construction, its economy of manufacture, its strong and durable nature, and its general effectiveness as a safety shield for the protection of the operator of the tool with which the structure is used and as a spacing gauge in the positioning of the barrel of said tool.

More specific objects of the present invention, and certain of its practical advantages, will be referred to in or will be evident from the following description of two embodiments of the invention, as illustrated in the accompanying drawings, in which:

Fig. 1 is a side elevational view of one embodiment of the present safety shield and spacing gauge structure;

Fig. 2 is a longitudinal sectional view of said structure as it appears in Fig. 1, and showing the front end portion of the barrel of a hand held powder-actuated tool on which the shield and gauge structure is slidably mounted for use with said tool;

Fig. 3 is a bottom plan view of the shield and gauge structure as it appears in Fig. 1;

Figure 4:
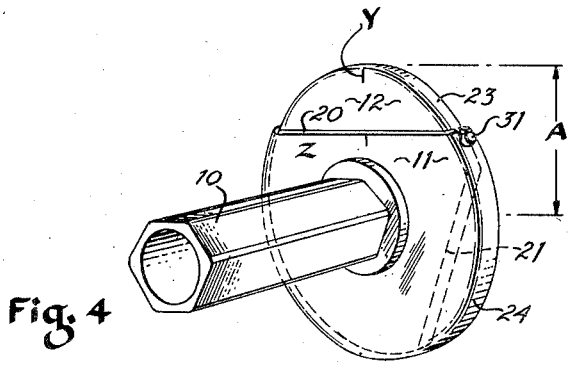
Fig. 4 is an upper perspective view of the shield and gauge structure as it appears in Figs. 1 and 3, the relatively movable plate-like parts of the structure being in that angular relationship thereof for maximum spacing, from a gauge reference point, of the barrel of the tool with which the structure is used.

Before the two shield and gauge structures here illustrated are specifically described, it is to be understood that such structures are illustrative only of the present invention and that shield and gauge structures embodying the invention may take various other forms. It also is to be understood that the terminology or phraseology herein used is for purposes of description and not of limitation, as the scope of the present invention is denoted by the appended claims.

Referring first to that embodiment of the invention which is illustrated in Figs. 1 to 5 inclusive, it will be noted that the safety shield and spacing gauge structure constituting such embodiment includes a tubular member 10, of any suitable length and of any suitable material, such as metal, and two plate-like members 11 and 12 which are mounted for rotary movement on the front end portion 13 of said tubular member 10. As will hereinafter appear, the two plate-like members 11 and 12 are not only of sufficient cross-dimensional area as to serve as an effective shield for the protection of the operator of the tool with which the present structure is used but also, said plate-like members have such relative angular movement as to serve as an effective gauge in the spacing of the barrel of said tool.

As heretofore mentioned, the present shield and gauge structure is particularly useful with hand held powder-actuated tools by which pins, studs and the like are embedded, for securing and supporting purposes, in steel, concrete, masonry, etc., and in Fig. 2 of the accompanying drawings, the use of the shield and gauge structure of Figs. 1 to 5 inclusive is shown with such a tool. For the disclosure of such use, only the front end portion of the tool barrel, and certain tool parts associated therewith, need be shown, but for a disclosure of the entire tool, reference may be had, if desired, to the copending application of Rowland J. Kopf et al. entitled "Explosively Actuated Tools," application Serial No. 355,034, filed May 14, 1953.

As shown in Fig. 2 of the accompanying drawings, the tubular member 10 of the present shield and gauge structure slidably receives the front end portion of the tool barrel 14, with means being provided to releasably maintain said tubular member, and the parts carried thereby, on said barrel. In the present embodiment of the invention, the bore of the tubular member 10 is of such cross-dimensional size that only the front end portion 13 of said member engages the tool barrel, the remaining portion of said bore being of increased cross-dimensional size to receive, around the tool barrel, a coiled compression spring 16. The function of said spring is to yieldably urge the tubular member 10, and the parts carried thereby, forwardly along the tool barrel, and for such purpose, the front end of the spring 16 engages the annular shoulder 17 of the tubular member 10 which is formed by the enlargement of its bore (Fig. 2) and the rear end of said spring (not shown) engages a suitable abutment (not shown) of the tool. Although any suitable means may be utilized for releasably maintaining the tubular member 10, and the parts carried thereby, on the tool barrel, the means here shown for said purpose comprises a centrally apertured nut 18 which is mounted on the externally threaded front end of the tool barrel and which nut also serves as a means for the releasable securement to the barrel of work-engaging or work-clamping jigs or fixtures.

In this first embodiment of the invention (the embodiment of Figs. 1 to 5 inclusive), the plate-like body portions of members 11 and 12 are of circular or disk form, but with each such body portion having a generally straight side edge, the straight side edge of member 11 being designated by the reference numeral 20 and the straight side edge of member 12 being designated by the reference numeral 21. As will be evident from Figs. 3, 4 and 5, these straight side edges 20 and 21 are chords of circles which define the circumferences of the plate-like body portions of members 11 and 12, with said chords being spaced any desired distances from the centers of said circles, centers which lie on the longitudinal axis of the bore of the tubular member 10 of the present shield and gauge structure.

As shown, each of the plate-like members 11 and 12 is provided with a forwardly extending circumferential flange, the flange 23 of member 12 being continuous and the flange 24 of member 11 being interrupted along the straight side edge 20 of said member. Preferably and as here shown, the relative cross dimensional sizes of members 11 and 12 are such that when said members are mounted on the front end portion 13 of the tubular member 10, in the nested relationship best shown in Fig. 2, the flange 23 of the frontmost member 12 lies just inside the flange 24 of member 11, except, of course, that portion of the flange 23 of member 12 which extends along the straight side edge 21 thereof. As will also appear from Fig. 2, the flange 23 of member 12 is of a length sufficiently less than that of flange 24 of member 11 as to enable the front ends of the two flanges to lie in substantially the same transverse plane when said members are in their normal nested relationship.

In the embodiment of the invention here shown, the front end portion 13 of the tubular member 10 is of reduced diametral size to provide, at the rear end of portion 13, an annular rear abutment shoulder 26 for the plate-like members 11 and 12. To increase the abutment area, a generally flat annular ring 27 may be and here is secured against said shoulder by the use of any suitable means, such as by brazing or the like.

Inasmuch as the plate-like member 11, the rearmost of the two members 11 and 12, has a fixed relationship with the tubular member 10, said member 11 is here shown as threadedly mounted on the front end portion 13 of member 10, the portion 13 being suitably externally threaded, of course, for such mounting. However, as to the plate-like member 12, it has, as will hereinafter appear, rotary movement with respect to the tubular member 10, and to prevent said member 12 from longitudinally moving along member 10 as it turns thereabout, member 12 is non-threadedly mounted on the front end portion 13 of member 10. As here shown, member 12 is merely slid onto the front end portion 13 of member 10, more or less loosely against member 11, and is held in such relationship with respect to member 11 by any suitable means, such as by the nut 28 in the present embodiment of the invention. To reduce the area of contact between members 11 and 12, and thereby to facilitate turning movement of member 12 relative to member 11, the plate-like body portion of member 12 may be provided with raised ribs or ridges, for engagement with the plate-like body portion of member 11, such as the annular concentric ribs or ridges 29 shown in Fig. 2.

Figure 5:
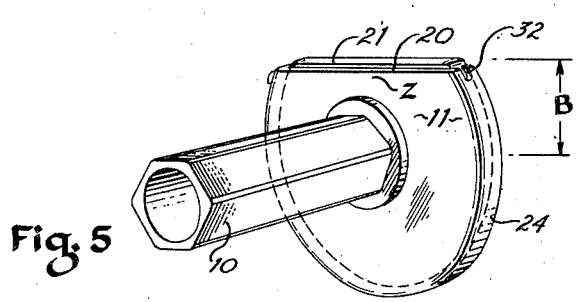
Fig. 5 is a view similar to Fig. 4 but with the relatively movable plate-like parts in that angular relationship thereof for minimum spacing, from a gauge reference point, of the barrel of the tool with which the structure is used.

As heretofore mentioned, the two concentrically mounted plate-like members 11 and 12 constitute the shield-forming and the gauge-forming parts of the present structure, and as will be evident from a comparison of Figs. 4 and 5, member 12 can be turned about the front end portion 13 of the tubular member 10 to locate it (member 12) in either of two positions with respect to member 11.

In Fig. 4, member 12 is in such position that a portion thereof projects beyond the straight side edge 20 of member 11 so that the two members jointly form a generally circular shield, with an area greater than that of either member 11 or 12 alone. It further will be noted that the barrel-receiving bore of the tubular member 10 is spaced the maximum distance from the circumference of the shield, such as the distance A between the longitudinal axis of said bore and the gauge reference point Y on the projecting portion of member 12.

In Fig. 5, member 12 is in such position that its straight side edge 21 coincides with the straight side edge 20 of member 11, with the consequent provision of a shield of the same size and shape as member 11 and hence of an area somewhat less than that of the circular shield shown in Fig. 4. It further will be noted that the barrel-receiving bore of the tubular member 10 is spaced the minimum distance from the circumference of the shield, namely, the distance B between the longitudinal axis of said bore and the gauge reference point Z at the middle of the straight side edge 20 of member 11.

As will be readily understood, the Fig. 5 angular relationship of members 11 and 12 of the present structure is the one which is used when it is desired to position the barrel of the tool with which said structure is used closer to some point or line of reference than is possible with the Fig. 4 angular relationship of said members. Normally or at other times, the position of the parts as shown in Fig. 4 is preferable, inasmuch as a safety shield of somewhat greater area is provided.

To releasably retain member 12 in either of its two angular positions with respect to member 11, a set screw 31 is here secured to the circumferential flange 23 of member 12 adjacent one end of its straight side edge 21, as best shown in Fig. 3. In the circumferential flange 24 of member 11, adjacent each end of its straight side edge 20, a notch 32 is provided, with the set screw being secured in one of said notches when member 12 is in its Fig. 4 position and in the other of said notches when said member is in its Fig. 5 position, as will be readily understood. In addition to serving as a means for the releasable retention of member 12 in either of its two positions, the set screw 31 also serves as a convenient handle to grasp in turning member 12 relative to member 11, as will be evident from Figs. 3 and 4.

Figure 6:
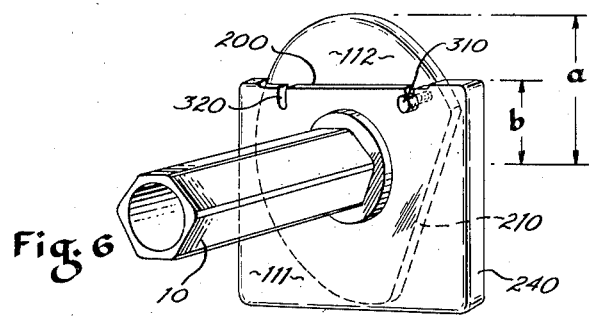
Fig. 6 is a view generally corresponding to Fig. 5 but showing a slightly modified form of the present shield and gauge structure.

In the embodiment of the invention illustrated in Figs. 1 to 5 inclusive, the plate-like member 11 as well as the plate-like member 12, is of generally disc form. If desired, however, member 11 may be of rectangular form, such as the member 111 of the embodiment of the invention illustrated in Fig. 6. Inasmuch as the shield and gauge structure constituting such second embodiment of the invention is otherwise generally the same as the embodiment of Figs. 1 to 5 inclusive and as it operates in the same manner, with member 111 being movable from a position in which a portion thereof projects beyond the side edge 200 of member 111, as in Fig. 6, to a position in which the straight side edge 210 of member 112 coincides with the side edge 200 of member 111, no detailed description of the structure of Fig. 6 is believed to be necessary. It might be noted, however, that in the embodiment of the invention illustrated in Fig. 6, the notches 320 for the reception of the retaining set screw 310 of member 112 are in the plate-like body portion of member 111, rather than in the forwardly extending peripheral flange 240 thereof.

To those skilled in the art to which the present invention relates, other features and advantages of shield and gauge structures embodying said invention will be evident from the foregoing description of two embodiments of said invention.

What is claimed is:

1. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members being mounted for rotary movement and being so formed that upon rotary movement a portion thereof can be caused to project laterally beyond the other of said members.

2. A safety shield and spacer gauge structure for powder-actuated tools having barrels through which pins, studs, and the like are fired, said structure comprising a tubular element for the reception of the barrel of such a tool, and a pair of shield and gauge members in nested relationship and of plate-like form, said members having a pair of aligned apertures, means for mounting said members on the front end of said tubular element by the use of said apertures, one of said members being mounted for rotary movement and being so formed that upon rotary movement a portion thereof can be caused to project laterally beyond the other of said members.

3. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members having a gauge-forming side edge portion, and the other of said members being mounted for rotary movement and being so formed that upon rotary movement a portion thereof can be caused to project laterally beyond the aforesaid side edge portion of said first mentioned member.

4. A safety shield and spacer gauge structure for powder-actuated tools having barrels through which pins, studs, and the like are fired, said structure comprising a tubular element for the reception of the barrel of such a tool, and a pair of shield and gauge members in nested relationship and of plate-like form, said members having a pair of aligned apertures, means for mounting said members on the front end of said tubular element by the use of said apertures, one of said members being fixedly mounted and the other of said members being rotatably mounted and both of said members having forwardly extending side edge flanges, the front ends of the flanges of both members lying in the same transverse plane, said rotary member being so formed that upon rotary movement thereof to one position, a portion thereof projects laterally beyond said fixed member.

5. A safety shield and spacer gauge structure for powder-actuated tools having barrels through which pins, studs, and the like are fired, said structure comprising a tubular element for the reception of the barrel of such tool, and a pair of shield and gauge members in nested relationship and of plate-like form, said members having a pair of aligned apertures, means for mounting said members on the front end of said tubular element by the use of said apertures, one of said members having a gauge-forming side edge portion and both of said members having forwardly extending edge flanges, the front ends of said flanges lying in the same transverse plane, one of said members being mounted for rotary movement and being so formed that upon rotary movement a portion thereof can be caused to project laterally beyond the other of said members.

6. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element, one of said members having a generally straight gauge-forming side edge portion, and the other of said members being mounted for rotary movement and being so formed that upon rotary movement a portion thereof can be caused to project laterally beyond the aforesaid side edge portion of said first mentioned member.

7. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members being of generally disc-shape but with a generally straight gauge-forming side edge portion, and the other of said members being mounted for rotary movement and being so formed that upon rotary movement a portion thereof can be caused to project laterally beyond the aforesaid side edge portion of said first mentioned member.

8. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members having a gauge-forming side edge portion, and the other of said members being mounted for rotary movement and being so formed that upon rotary movement to one position, a portion thereof projects laterally beyond the aforesaid side edge portion of said first mentioned member, and upon rotary movement to another position, it has no portion projecting laterally beyond the aforesaid side edge portion of said first mentioned members.

9. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members having a gauge-forming side edge portion, and the other of said members being mounted for rotary movement and being so formed that upon rotary movement to one position, a portion thereof projects laterally beyond the aforesaid side edge portion of said first mentioned member, and upon rotary movement to another position, it has no portion projecting laterally beyond the aforesaid side edge portion of said first mentioned members, and means for releasably holding said rotary plate-like member in either of its aforesaid positions.

10. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members having a gauge-forming side edge portion, and the other of said members being mounted for rotary movement and being so formed that upon rotary movement to one position, a portion thereof projects laterally beyond the aforesaid side edge portion of said first mentioned member, and upon rotary movement to another position, it has no portion projecting laterally beyond the aforesaid side edge portion of said first mentioned members, and a set screw carried by said rotary member and set screw receiving slots in the other of said members for releasably holding said rotary member in either of its aforesaid positions.

11. A safety shield and spaced gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members having a gauge-forming side edge portion, and the other of said members being mounted for rotary movement and being so formed that upon rotary movement to one position, a portion thereof projects laterally beyond the aforesaid side edge portion of said first mentioned member, and upon rotary movement to another position, it has no portion projecting laterally beyond the aforesaid side edge portion of said first mentioned members, and means for releasably holding said rotary plate-like member in either of its aforesaid positions, said holding means including a part projecting from said rotary member and which also serves as a handle to be grasped in imparting rotary movement to said member.

12. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, and each of said members having a straight side edge portion, one of said members being mounted for fixed relationship with respect to said tubular element and the other of said members being mounted for rotary movement with respect to said tubular member, said rotary member being movable, by rotary movement thereof, to either of two positions, one in which its straight side edge portion registers with the straight side edge portion of the fixed member and the other position being one in which a portion of said rotary member projects laterally beyond the straight side edge portion of said fixed member.

13. A safety shield and spacer gauge structure for powder-actuated tools having barrels through which pins, studs, and the like are fired, said structure comprising a tubular element for the reception of the barrel of such a tool and having an externally threaded front end portion, and a pair of shield and gauge members of plate-like form having a pair of aligned apertures, means for mounting said members on the front end of said tubular element by the use of said apertures, one of said members being threadedly mounted on the front end portion of said tubular element for fixed relationship therewith and the other of said members being non-threadedly mounted on the front end portion of said tubular element for rotary movement relative thereto, said rotary member being so formed that upon rotary movement a portion thereof can be caused to project laterally beyond said fixed member.

14. A safety shield and spacer gauge structure for powder-actuated tools having barrels through which pins, studs, and the like are fired, said structure comprising a tubular element for the reception of the barrel of such a tool, and a pair of shield and gauge members of plate-like form having a pair of aligned apertures, means for mounting said members on the front end of said tubular element by the use of said apertures, one of said members being fixed on said tubular element and having a gauge-forming side edge portion, the other of said members being rotatably mounted on said tubular element, said rotary member being provided with a forwardly extending side edge flange of continuous form and said fixed member being provided with a forwardly extending side edge flange which is continuous except along its gauge-forming side edge portion, the said fixed and rotary members being mounted in nested relationship on the tubular element, said rotary member being so formed that upon rotary movement to one position a portion thereof can be caused to project laterally beyond the gauge-forming side edge portion of said fixed member.

References Cited in the file of this patent
FOREIGN PATENTS 1,058,870     France _____ Nov. 10, 1953